US009325803B2

(12) United States Patent
Frydman et al.

(10) Patent No.: US 9,325,803 B2
(45) Date of Patent: *Apr. 26, 2016

(54) METHODS, CIRCUITS, DEVICES, SYSTEMS AND ASSOCIATED COMPUTER EXECUTABLE CODE FOR CACHING CONTENT

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IS)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,129

(22) Filed: Dec. 25, 2014

(65) Prior Publication Data

US 2015/0304443 A1    Oct. 22, 2015

Related U.S. Application Data

(63) Continuation of application No. 13/269,776, filed on Oct. 10, 2011, now Pat. No. 8,943,216.

(60) Provisional application No. 61/446,056, filed on Feb. 24, 2011, provisional application No. 61/530,978, filed on Sep. 4, 2011.

(51) Int. Cl.
| | | |
|---|---|---|
| *G06F 15/16* | (2006.01) | |
| *G06F 13/00* | (2006.01) | |
| *H04L 29/08* | (2006.01) | |
| *H04N 21/222* | (2011.01) | |
| *G06F 17/30* | (2006.01) | |

(52) U.S. Cl.
CPC ........ *H04L 67/2842* (2013.01); *H04L 67/1097* (2013.01); *H04L 67/2819* (2013.01); *H04N 21/222* (2013.01); *G06F 17/30902* (2013.01)

(58) Field of Classification Search
CPC .................... G06F 17/30132; G06F 17/30902; H04L 67/288
USPC .......................... 709/217, 231, 232; 711/118
See application file for complete search history.

(56) References Cited

U.S. PATENT DOCUMENTS

| | | | |
|---|---|---|---|
| 7,359,956 B2 * | 4/2008 | Kanai et al. ................... | 709/219 |
| 7,437,364 B1 * | 10/2008 | Fredricksen et al. | |
| 7,552,338 B1 * | 6/2009 | Swildens et al. .............. | 713/176 |

(Continued)

*Primary Examiner* — Joe Chacko
(74) *Attorney, Agent, or Firm* — Vladimir Sherman; Professional Patent Solutions

(57) ABSTRACT

Disclosed are methods, circuits, devices, systems and associated computer executable code for caching content. According to embodiments, a client device may be connected to the internet or other distributed data network through a gateway network. As initial portions of client requested content enters the gateway network, the requested content may be characterized and compared to content previously cached on a cache integral or otherwise functionally associated with the gateway network. In the event a match is found, a routing logic, mechanism, circuitry or module may replace the content source server with the cache as the source of content being routed to the client device. In the event the comparison does not produce a match, as content enters the network a caching routine running on processing circuitry associated with the gateway network may passively cache the requested content while routing the content to the client device.

20 Claims, 8 Drawing Sheets

(56) References Cited

U.S. PATENT DOCUMENTS

| | | | |
|---|---|---|---|
| 7,818,506 B1* | 10/2010 | Shepstone et al. | 711/133 |
| 8,429,169 B2* | 4/2013 | Koopmans et al. | 707/741 |
| 2005/0102427 A1* | 5/2005 | Yokota et al. | 709/245 |
| 2005/0125553 A1* | 6/2005 | Wu et al. | 709/233 |
| 2006/0184656 A1* | 8/2006 | Roddy | 709/223 |
| 2007/0266113 A1* | 11/2007 | Koopmans et al. | 709/217 |
| 2008/0051029 A1* | 2/2008 | Witteman et al. | 455/17 |
| 2009/0204682 A1* | 8/2009 | Jeyaseelan et al. | 709/217 |
| 2010/0088398 A1* | 4/2010 | Plamondon | 709/220 |
| 2011/0137888 A1* | 6/2011 | Yoo et al. | 707/713 |

* cited by examiner

METHODS, CIRCUITS, DEVICES, SYSTEMS AND ASSOCIATED COMPUTER EXECUTABLE CODE FOR CACHING CONTENT

CROSS REFERENCE

The present application is a continuation application of U.S. Ser. No. 13/269,776 filed Oct. 10, 2011, which in turn claims the benefit of U.S. Provisional Patent Application 61/446,056 filed Feb. 24, 2011, and U.S. Provisional Patent Application 61/530,978 filed Sep. 4, 2011, the disclosures of which are each incorporated herein by reference.

FIELD OF THE INVENTION

Some embodiments relate generally to the field of caching systems and, more particularly, to methods, circuits, devices, systems and associated computer executable code for caching content.

BACKGROUND

Remote on-demand access to computer and communication network resources, including Internet access is becoming more widespread. With the Internet becoming increasingly popular, more network users are able to connect to a remote server through any device with an internet connection. Users are able to connect to the Internet from home computers, laptops, tablets, smart phones, e-book readers, and any other mobile Internet device. When connected to the internet, many users are downloading or streaming large amounts of data e.g. when watching a movie.

The growing demand for TCP/IP services over mobile networks, including streaming data rich content such as video, has created enormous bandwidth and data traffic requirements. Caching of data rich content can be an effective method for reducing the traffic load on mobile networks.

While caching data based on Uniform Resource Locators (URLs) was an effective method, modern websites and video content providers are using dynamic URLs for their content. Therefore, a URL alone cannot be used to categorize and/or classify content; content data in addition to metadata associated with the content must be analyzed for a robust caching decision algorithm.

There is thus a need in the field of caching systems for improved methods, circuits, devices, systems and associated computer executable code for caching content.

SUMMARY OF THE INVENTION

The present invention includes methods, circuits, devices, systems and associated computer executable code for caching content. According to some embodiments of the present invention, a client device (e.g. personal computer, smartphone, etc.) may request content from a content source server connected to the internet or some other distributed data network. The client device may be connected to the internet or other distributed data network through a gateway network (e.g. local area network, wide area network, wireless local area network, cellular network, etc.). As initial portions of requested content enter the gateway network, it may be characterized and compared to content previously cached on a cache integral or otherwise functionally associated with the gateway network.

According to some embodiments of the present invention, as initial portions of requested content pass through a node of the gateway network, a characterization algorithm or routine running on processing circuitry associated with the node may generate characterization information relating to the content, which characterization information may also be referred to as a Content ID (CID) or fingerprint. According to further embodiments of the present invention, a comparison algorithm or routine running on computational circuitry associated with the same or another node of the gateway network may compare the fingerprint generated from content entering the gateway network to fingerprints of previously cached content, and in the event a match is found, a routing logic, mechanism, circuitry or module may replace the content source server with the cache as the source of content being routed to the client device. In the event the comparison does not produce a match, as content enters the network a caching routine running on processing circuitry associated with the gateway network may passively cache the requested content while routing the content to the client device.

According to some embodiments of the present invention, characterization of content received by a gateway network node may include running a recognition algorithm on the requested content. The recognition algorithm may include calculating a checksum or a hash sum over one or more segments of the received content (e.g. over a data packet or a datagram). According to further embodiments of the present invention, the recognition algorithm may include a data packet inspection routine, wherein data packet inspection may include analyzing data associated with a received data packet. According to further embodiments of the present invention, data associated with the packet may include header data, addressing data, payload data and/or metadata.

According to some embodiments of the present invention, characterization computational circuitry associated with the gateway network may be configured as a network bridge when operating within the gateway network data flow or as a network data sniffer when operating from outside the network data flow. Characterization computational circuitry may operate on network data from any point along the network data flow.

According to some embodiments of the present invention, a cache integral or otherwise functionally associated with the gateway network may include one or more storage elements (e.g. internal, external and/or cloud based) for storing cached data. According to further embodiments of the present invention, the cache may include one or more storage elements for storing CID or fingerprint data paired with the cached data. According to further embodiments of the present invention, the CID or fingerprint data may be stored in substantially the same storage element.

According to some embodiments of the present invention, when a fingerprint of content entering the gateway network is matched to a fingerprint of previously cached content, the content source server may be instructed to drop the current session with the gateway network. The session may be continued by a storage element associated with the cache, wherein previously cached content may be routed from the storage element to the client device. According to some embodiments of the present invention, a proxy server associated with the cache may extract matched content from the storage element and stream the content to the client device using substantially the same content source addressing as the content source server. According to further embodiments of the present invention, the proxy server may employ a spoofing e.g. a Network Address Translation (NAT) routine to modify the content source address of the content. According to some embodiments of the present invention, the proxy server may extract matched content from the storage element and stream the content to the client device over a new session between the cache and the client device.

According to some embodiments of the present invention, when a fingerprint of requested content entering the gateway network does not match a fingerprint of previously cached content, the requested content may be routed to a storage element associated with the cache. According to some embodiments of the present invention, when the storage element receives a predetermined percentage of the requested content, a session between the content source server and the client device may be terminated. According to further embodiments of the present invention, a proxy server associated with the cache may extract requested content from the storage element and stream the requested content to the client device over a new session between the cache and the client device. According to some embodiments of the present invention, the proxy server may stream the content to the client device using substantially the same content source addressing as the content source server. According to further embodiments of the present invention, the proxy server may employ a spoofing e.g. a NAT routine to modify the content source address of the content.

According to some embodiments of the present invention, following a client device connection termination, requested content may be routed to a storage element in its entirety before closing a session with the content source server. According to some embodiments of the present invention, if a portion of requested content is missing in the storage element, the missing portion may be requested from the content source server.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
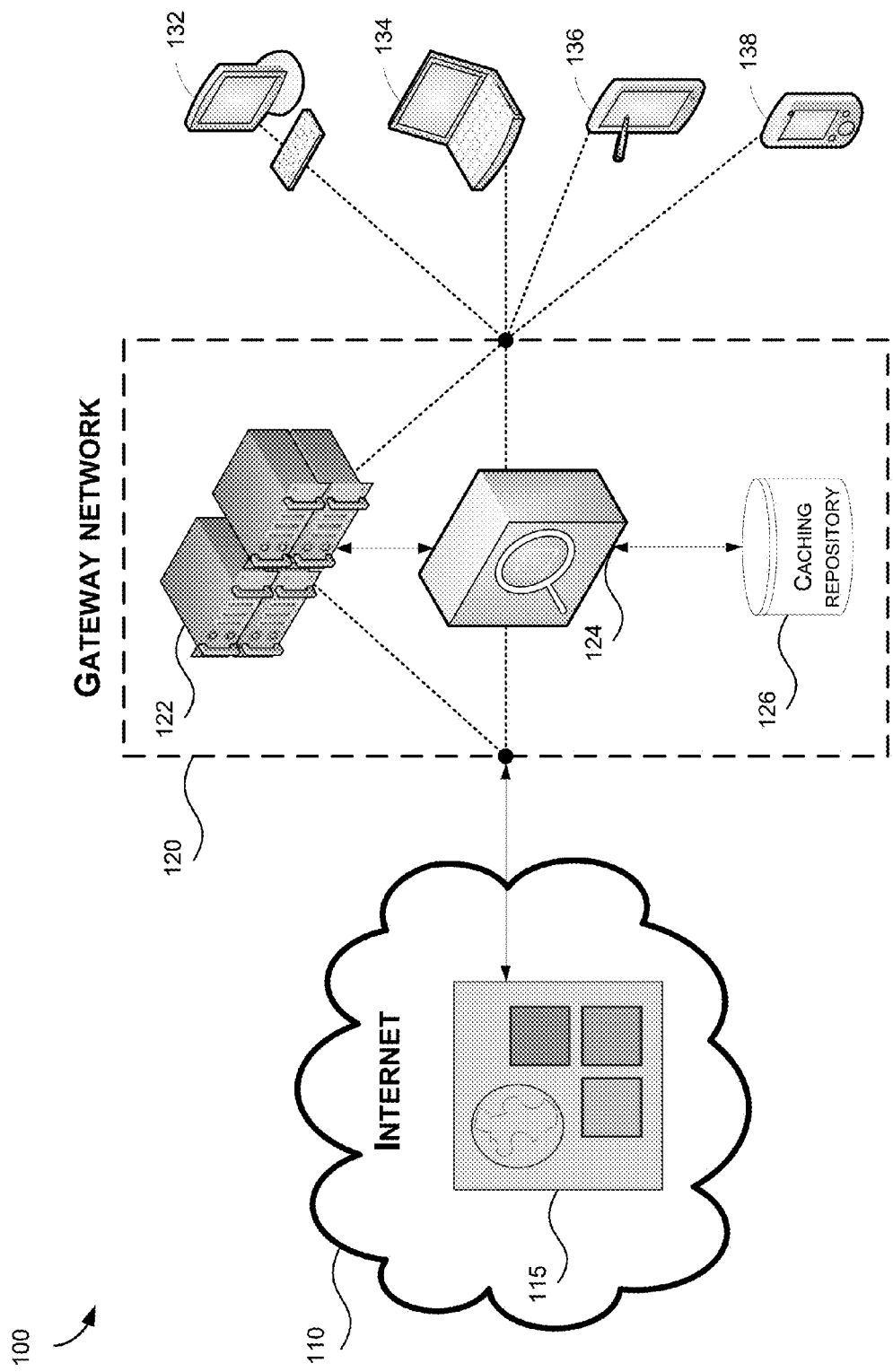
FIG. 1 shows a general system level diagram showing a content source, gateway network and client devices, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories.

According to some embodiments of the present invention, there may include a content caching system for a gateway network, comprising: (a) a content characterization module to generate one or more characterization parameters of received content passing through the gateway network from an external content source to a client device connected to the gateway network; (b) a cache repository to store one or more content entities and characterization parameters for at least one of the one or more content entities; (c) a comparison module to compare the one or more characterization parameters generated by the content characterization module against characterization parameters of content entities stored in the cache repository, wherein a stored content entity whose characterization parameters match those of the received content is termed a matched content entity; and (d) a routing module to route the matched content entity to the client device.

According to some embodiments of the present invention, the routing module may be further configured to terminate a session with the external content source substantially when the matched content entity is routed to the client device.

According to some embodiments of the present invention, received content with characterization parameters that do not match characterization parameters of a stored content entity may be termed a non-matched content entity. According to further embodiments of the present invention, the routing module may be further configured to route the non-matched content entity to the cache repository for storage. According to further embodiments of the present invention, the routing module may be further configured to route the non-matched content entity to the client device in parallel with routing the non-matched content entity to the cache repository.

According to some embodiments of the present invention, the routing module may be further configured to route the non-matched content entity to the client device after routing at least a portion of the non-matched content entity to the cache repository. According to further embodiments of the present invention, the routing module may be further configured to terminate a session with the external content source substantially when the non-matched content entity is routed to the client device. According to some embodiments of the present invention, the routing module may be further configured to continue a session with the external content source even when the client disconnects from the gateway network.

According to some embodiments of the present invention, there may include a gateway network comprising: (a) a client device interface to receive a content request from a client device connected to the gateway network and to forward the requested content to the client device; (b) a content source interface to receive the requested content from an external content source; and (c) a content caching unit. According to further embodiments of the present invention, the content caching unit may comprise: (1) a content characterization module to generate one or more characterization parameters of received content; (2) a cache repository to store one or more content entities and characterization parameters for at least one of the one or more content entities; (3) a comparison module to compare the one or more characterization parameters generated by the content characterization module against characterization parameters of content entities stored in the cache repository, wherein a stored content entity whose characterization parameters match those of the received content is termed a matched content entity; and (4) a routing module to route the matched content entity to the client device.

According to some embodiments of the present invention, the routing module may be further configured to terminate a session with the external content source substantially when the matched content entity is routed to the client device. According to some embodiments of the present invention, received content with characterization parameters that do not match characterization parameters of a stored content entity may be termed a non-matched content entity. According to further embodiments of the present invention, the routing module may be further configured to route the non-matched content entity to the cache repository for storage.

According to some embodiments of the present invention, the routing module may be further configured to route the non-matched content entity to the client device in parallel with routing the non-matched content entity to the cache repository. According to some embodiments of the present invention, the routing module may be further configured to route the non-matched content entity to the client device after routing at least a portion of the non-matched content entity to the cache repository. According to further embodiments of the present invention, the routing module may be further configured to terminate a session with the external content source substantially when the non-matched content entity is routed to the client device.

According to some embodiments of the present invention, the routing module may be further configured to continue a session with the external content source even when the client disconnects from the gateway network. According to some embodiments of the present invention, the content caching unit may be integral to a core network infrastructure of the gateway network. According to some embodiments of the present invention, the content caching unit may be integral to an access network infrastructure of the gateway network.

According to some embodiments of the present invention, there may include a method for caching content in a gateway network. The method may comprise receiving a content request from a client device connected to the gateway network; requesting and receiving the requested content from an external content source and forwarding the requested content to the client device. The method may further comprise: (a) generating one or more characterization parameters of received content; (b) storing one or more content entities and characterization parameters for at least one of the one or more content entities; (c) comparing the one or more characterization parameters against characterization parameters of stored content entities, wherein a stored content entity whose characterization parameters match those of the received content is termed a matched content entity; and (d) routing the matched content entity to the client device.

According to some embodiments of the present invention, the method may further comprise terminating a session with the external content source substantially when the matched content entity is routed to the client device. According to further embodiments of the present invention, received content with characterization parameters that do not match characterization parameters of a stored content entity may be termed a non-matched content entity. According to further embodiments of the present invention, the method may further comprise routing the non-matched content entity for storage. According to some embodiments of the present invention, the method may further comprise routing the non-matched content entity to the client device in parallel with routing the non-matched content for storage. According to some embodiments of the present invention, the method may further comprise routing the non-matched content entity to the client device after routing at least a portion of the non-matched content entity for storage.

According to some embodiments of the present invention, the method may further comprise terminating a session with the external content source substantially when the non-matched content entity is routed to the client device. According to some embodiments of the present invention, the method may further comprise continuing a session with the external content source even when the client disconnects from the gateway network.

Now turning to FIG. 1, there is shown a general system level diagram (100) showing a content source, gateway network and client devices, according to some embodiments of the present invention.

According to some embodiments of the present invention, a content source (115) associated with a computer or communication network (e.g. the Internet 110) may deliver content requested by a client device (e.g. computer 132, laptop 134, tablet 136 or smart phone 138) to a node of the gateway network (120). Before forwarding the requested content to a client device, a gateway network server (122) may forward the requested content to an integral or otherwise functionally associated content characterization-based caching system (124) to check for matching content on a local caching repository (124). According to further embodiments of the present invention, when matched content is found on the local caching repository (124), the matched content may be forwarded by the gateway network server (122) or the caching system (124) to the client device via a node of the gateway network (120).

Figure 2A:
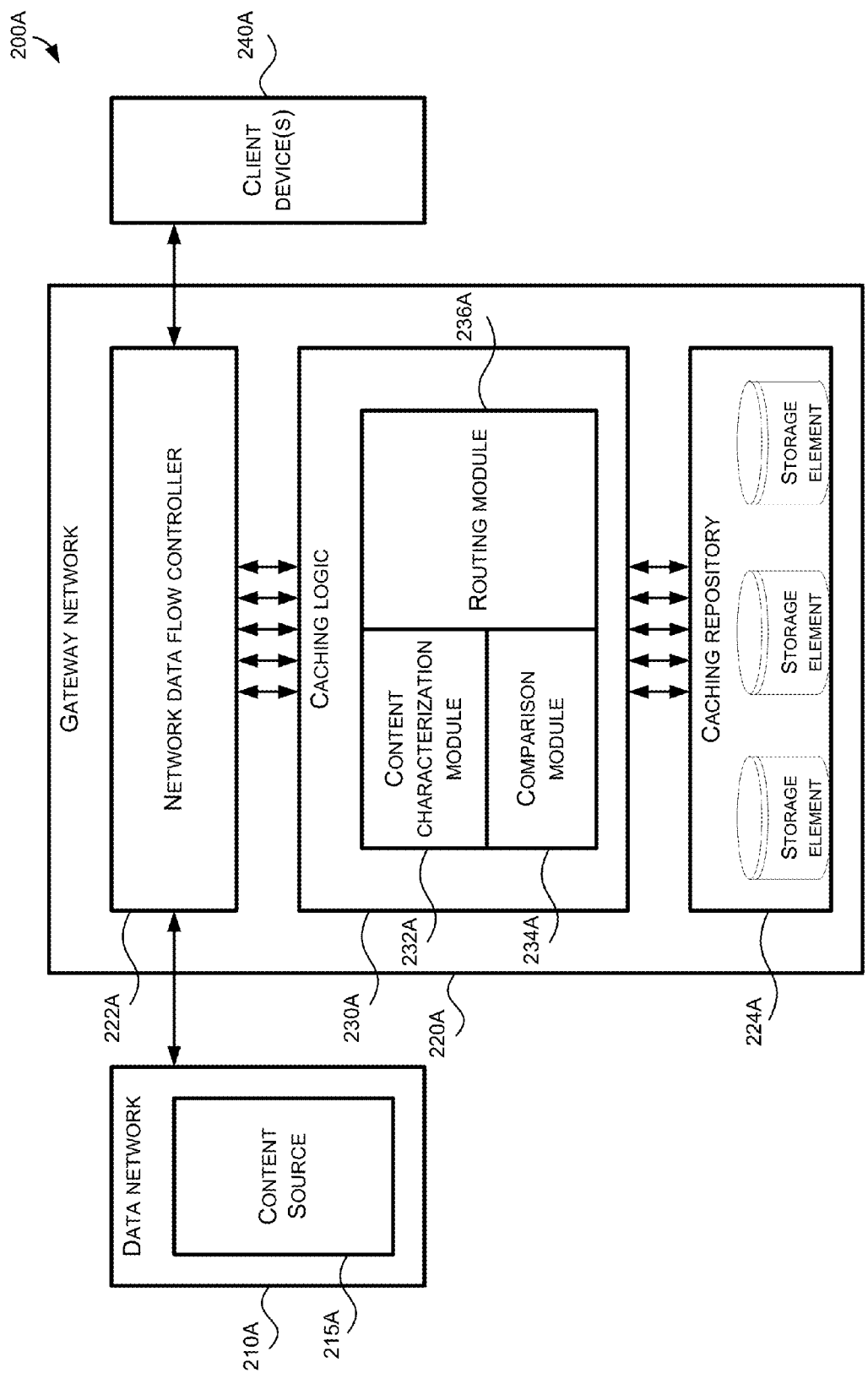
FIG. 2A shows a functional block diagram of a gateway network including caching logic and a caching repository, according to some embodiments of the present invention.
Figure 2B:
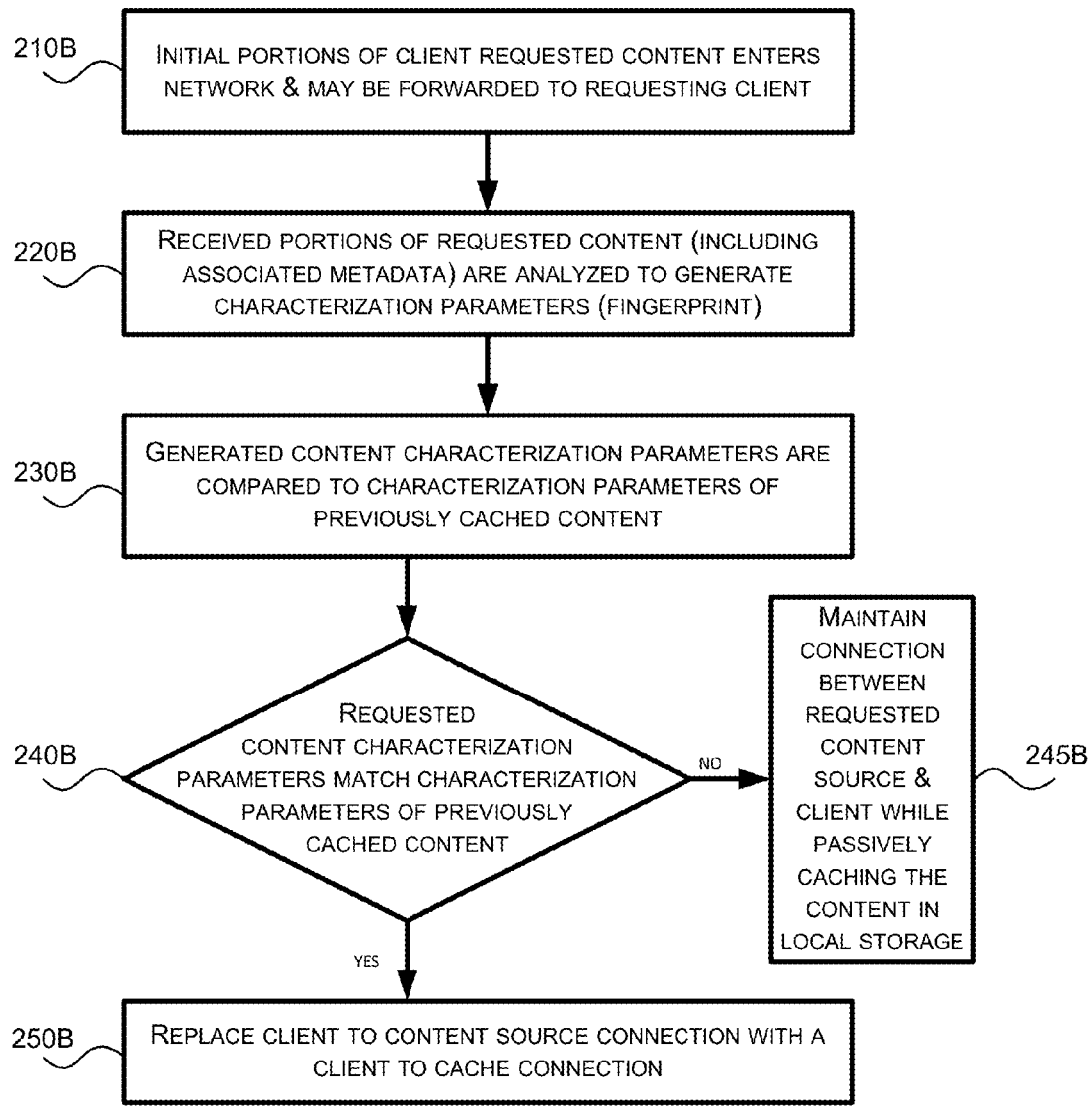
FIG. 2B is a flow chart including the steps of caching content flowing through a gateway network, according to some embodiments of the present invention.

Now turning to FIG. 2A, there is shown a functional block diagram (200A) of a gateway network (220A) including caching logic and a caching repository, according to some embodiments of the present invention. The gateway network (220A) may be described in view of FIG. 2B showing a flow chart including the steps of caching content flowing through a gateway network (220A), according to some embodiments of the present invention.

According to some embodiments of the present invention, a client device (240A) may request content from a content source (215A) located on some external data network (210A). According to further embodiments of the present invention, initial portions of the client requested content may enter the network and may be forwarded (210B) by a network data flow controller (222A) to the requesting client. According to some embodiments of the present invention, caching logic (230A) integral or otherwise functionally associated with the gateway network (220A) may analyze (220B) received portions of requested content in addition to associated metadata. An integral content characterization module (232A) may generate (220B) characterization parameters (e.g. a content ID or fingerprint). According to further embodiments of the present invention, an integral comparison module (234A) may compare (230B) the generated content characterization parameters to characterization parameters of previously cached content. The previously cached content may be stored in an integral or functionally associated caching repository (224A) containing one or more storage elements.

According to some embodiments of the present invention, when requested content characterization parameters do not match characterization parameters of previously cached content (240B), a connection between the requested content source (215A) and the client (240A) may be maintained (245B) while passively caching the content. According to further embodiments of the present invention, an integral or otherwise functionally associated routing module (236A) may route a copy of the requested content, along with associated characterization data to the caching repository (224A) for local storage.

According to some embodiments of the present invention, when requested content characterization parameters match characterization parameters of previously cached content (240B), a connection between the requested content source (215A) and the client (240A) may be replaced (250B) with a connection between the caching repository (224A) and the client. According to further embodiments of the present invention, the routing module (236A) may forward a copy of the cached data to the client device (240A).

Figure 2C:
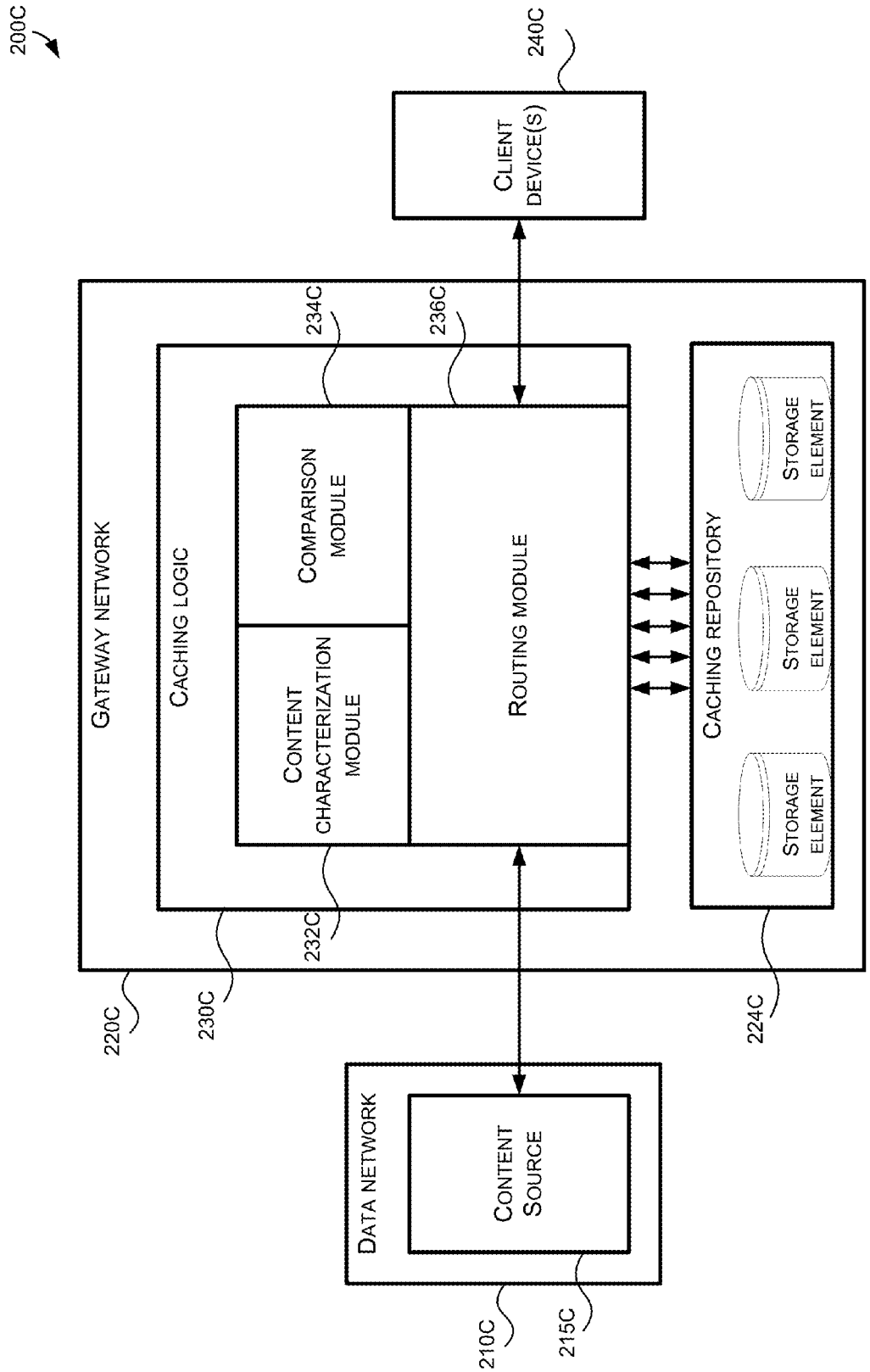
FIG. 2C shows a functional block diagram of a gateway network where network data flows through a routing module of the caching logic, according to some embodiments of the present invention.

Now turning to FIG. 2C, there is shown a functional block diagram (200C) of a gateway network (220C) where network data flows through a routing module of the caching logic, according to some embodiments of the present invention.

It is understood that elements 210A, 215A, 220A, 224A, 230A, 232A, 234A and 240A of FIG. 2A are substantially the same as elements 210C, 215C, 220C, 224C, 230C, 232C, 234C and 240C of FIG. 2C respectively.

According to some embodiments of the present invention, a client device (240C) may request content from a content source (215C) located on some external data network (210C). According to further embodiments of the present invention, initial portions of the client requested content may enter the network via a routing module (236C) and may be forwarded to the requesting client. According to some embodiments of the present invention, the routing module (236C) may route a copy of the requested content, along with associated characterization data to a caching repository (224C) for local storage. According to some embodiments of the present invention, the routing module (236C) may forward a copy of the cached data to the client device (240C).

Figure 3A:
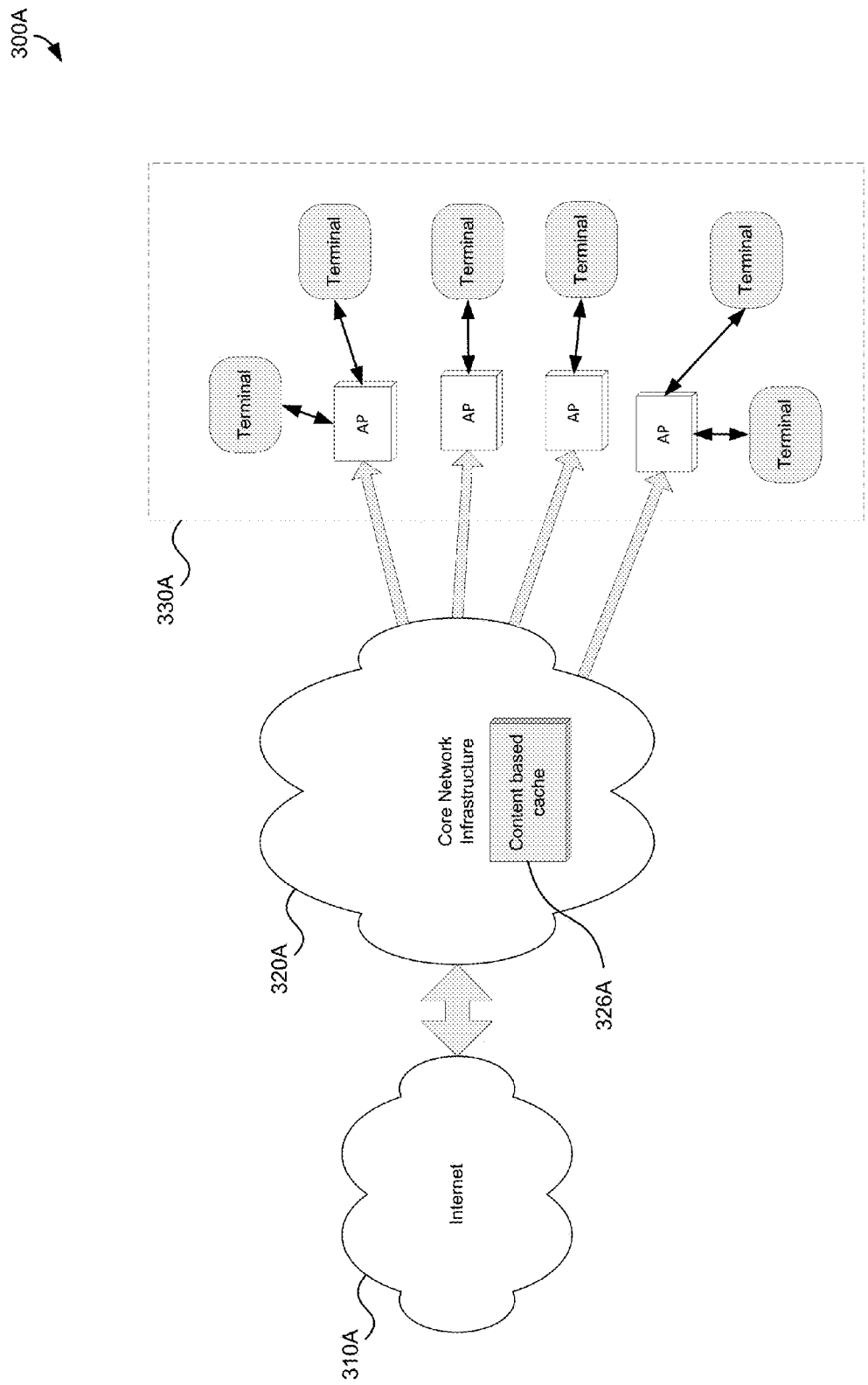
FIG. 3A shows a general system level diagram of a generalized communication and/or computer network where a core network infrastructure includes a content based cache, according to some embodiments of the present invention.

Now turning to FIG. 3A, there is shown a general system level diagram of a generalized communication and/or computer network (300A) where a core network infrastructure (320A) includes a content based cache (326A), according to some embodiments of the present invention.

According to some embodiments of the present invention, content may be requested from the internet (310A) by a client or terminal (330A) connected to a core network infrastructure (320A). The terminal (330A) may be connected to the core network infrastructure (320A) via an access point (AP—330A). According to further embodiments of the present invention, a content based cache (326A) integral to or otherwise functionally associated with the core network infrastructure (320A) may analyze incoming requested content and characterize the content based on its data contents and/or metadata. According to some embodiments of the present invention, if the requested content characterization does not match a characterization of previously cached content, the requested content may be stored in the cache. If the requested content characterization matches a characterization of previously cached content, the previously cached content may be forwarded to the terminal (330A).

Figure 3B:
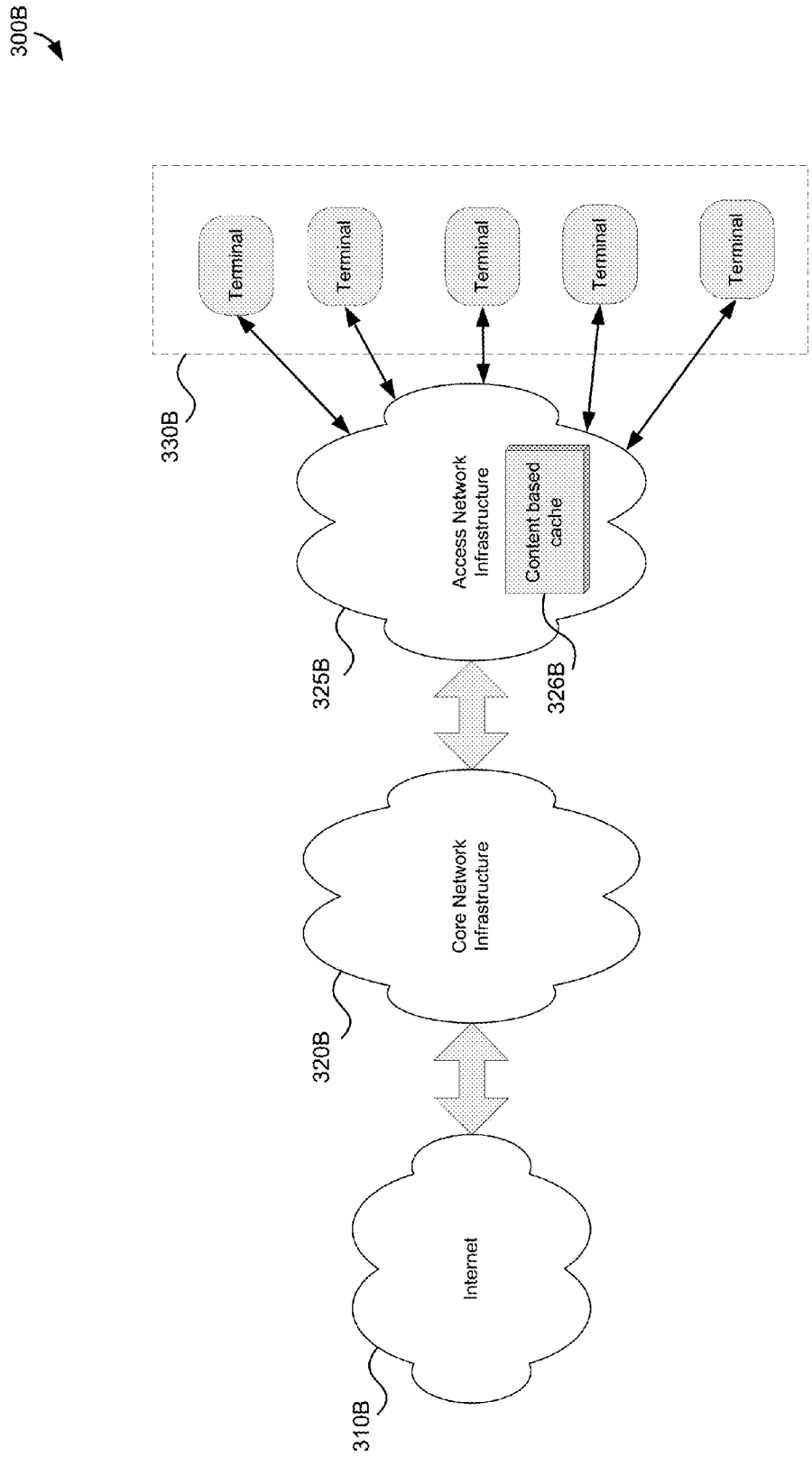
FIG. 3B shows a general system level diagram of a generalized communication and/or computer network where an access network infrastructure includes a content based cache, according to some embodiments of the present invention.

Now turning to FIG. 3B, there is shown a general system level diagram of a generalized communication and/or computer network (300B) where an access network infrastructure (325B) includes a content based cache (326B), according to some embodiments of the present invention.

According to some embodiments of the present invention, content may be requested from the internet (310B) by a client or terminal (330B) connected to a core network infrastructure (320B). The terminal (330B) may be connected to the core network infrastructure (320B) via an access network infrastructure (325B). According to further embodiments of the present invention, a content based cache (326B) integral to or otherwise functionally associated with the access network infrastructure (325B) may analyze incoming requested content and characterize the content based on its data contents and/or metadata. According to some embodiments of the present invention, if the requested content characterization does not match a characterization of previously cached content, the requested content may be stored in the cache. If the requested content characterization matches a characterization of previously cached content, the previously cached content may be forwarded to the terminal (330A).

Figure 4:
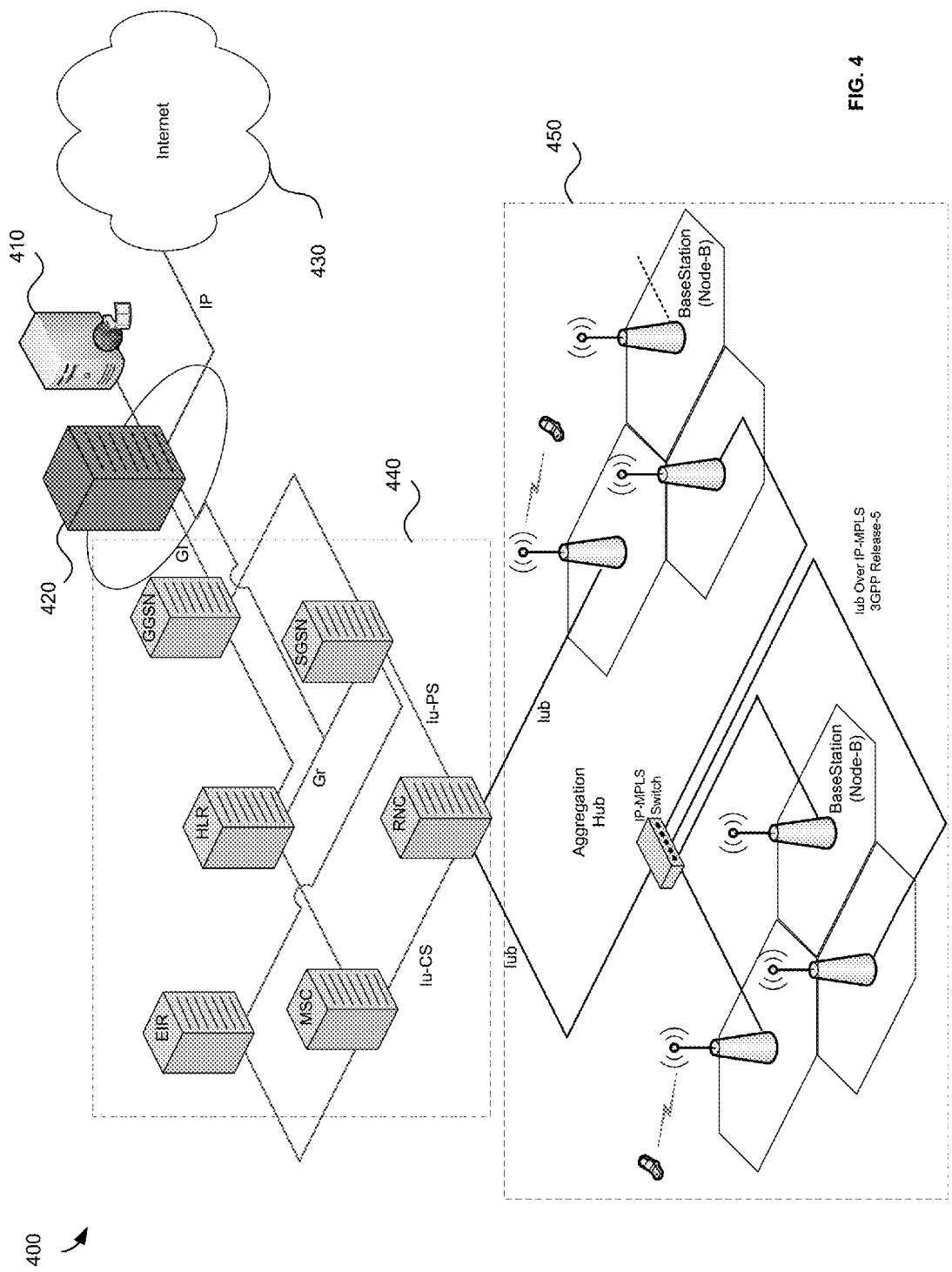
FIG. 4 shows a general system level diagram of a content based caching system in a mobile network, according to some embodiments of the invention.

Now turning to FIG. 4, there is shown a general system level diagram of a content based caching system in a mobile network (400), according to some embodiments of the invention. According to some embodiments of the present invention, a core network infrastructure of the computer network (440) may be connected to an access network infrastructure of the computer network (450). According to further embodiments of the present invention, a mobile user may request content from a connecting base station in the access network infrastructure (450). The request may be forwarded by the core network infrastructure to a functionally associated content based cache (420). According to further embodiments of the present invention, the content based cache (420) may retrieve the content from the internet (430), analyze the content and generate a fingerprint based on the content and associated metadata. According to further embodiments of the present invention, the content based cache (420) may compare the fingerprint to previously cached content. If there is a match, the matched cached content may be forwarded to the mobile user via the core network infrastructure (440) and the access network infrastructure (450). If there is no match, the content based cache (420) may store the content in addition to forwarding the content to the mobile user.

Figure 5:
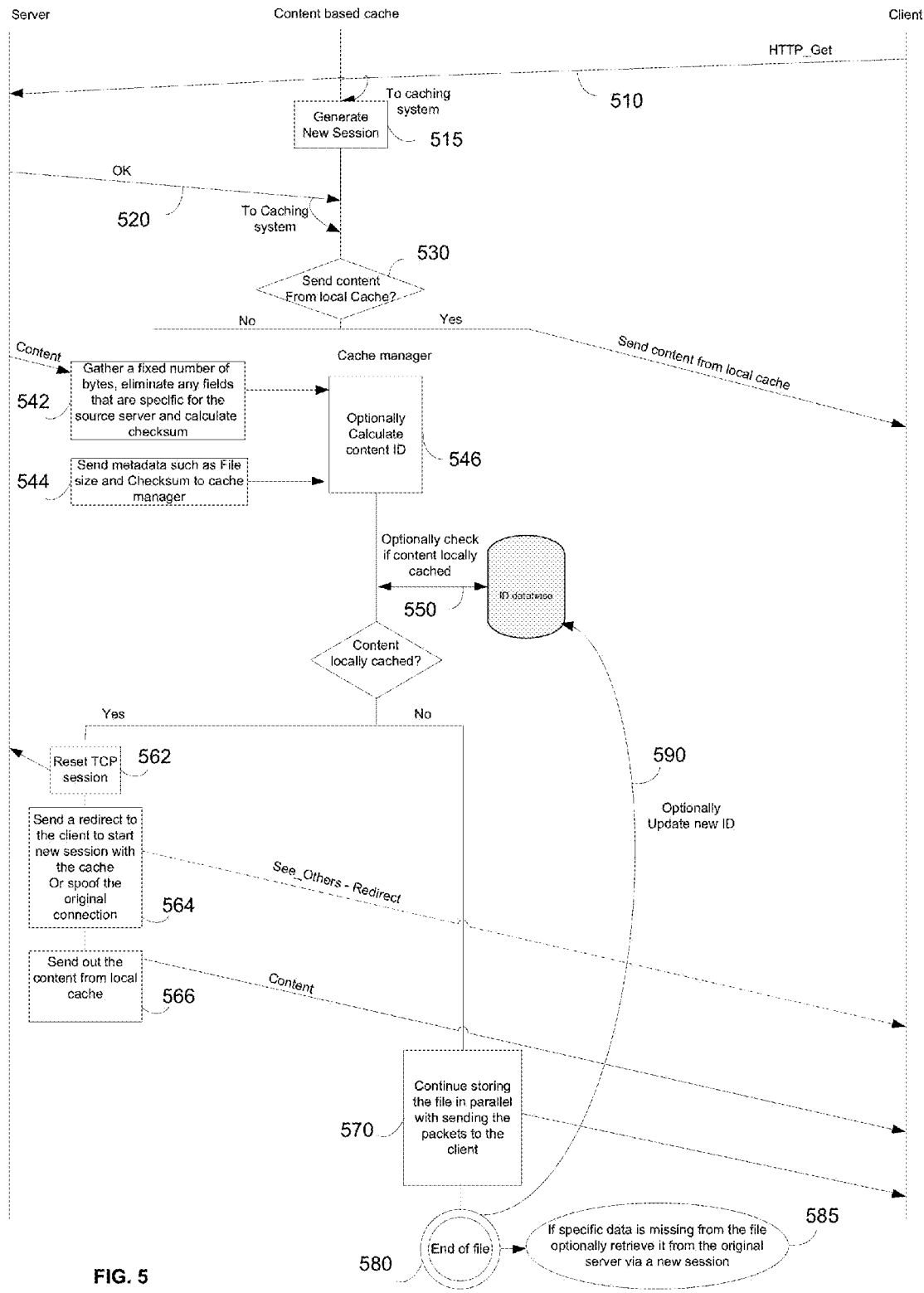
FIG. 5 is a flow chart including the steps of content based caching, according to some embodiments of the invention.

Now turning to FIG. 5, there is show a flow chart including the steps of content based caching, according to some embodiments of the invention.

According to some embodiments of the present invention, a client may issue an HTTP_Get command to an associated server (510) to request content. The server may commence the session with the client (520). The content request, in addition to some or all of the received content may pass through a local cache system and/or may be sniffed by a local cache system. The cache system may buffer received data while generating an ID unique to the received data (546). The cache system may use the unique ID to check if content substantially identical to the client requested content is already locally cached (550). If the requested content is already in the local cache, the content may be sent from the local cache. If the requested content is not in the local cache, the buffered content may be forwarded to the client and the rest of the content may be sent from the originally requested server to the client. The local cache may cache the content in a passive mode in parallel to it being sent to the client.

According to further embodiments of the present invention, when the content is locally cached, a TCP session with the server may be reset (562). A redirect may be sent to the client to start a new session with the cache or the original connection may be spoofed (564). The content may be sent to the client from the local cache (566). According to further embodiments of the present invention, when the content is not locally cached, the content based cache may continue storing the file in parallel with sending the packets to the client (570) until the end of the content file (580). If specific data is missing from the file, the missing data may be retrieved from the server via a new session (585). The ID of the file may be updated in the ID database (590).

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A content caching system for a gateway network, wherein said system comprises:
   a network data flow controller comprising circuitry adapted to regulate data flow between an external content source and a client device and forward a stream of a given media content from the content source to the client device;
   a cache repository to store media contents and characterization parameters of the media contents; and
   processing circuitry communicatively coupled to a digital memory containing processor executable code, which processor executable code causes said processing circuitry to:
   (i) sniff the stream of the given media content and generate one or more characterization parameters of the given media content passing through the gateway network from the external content source to the client device;
   (ii) compare the generated one or more characterization parameters of the media content against stored characterization parameters of media contents stored in said cache repository; and
   (iii) route a selected media content stored in the cache repository to the client device, which selected media content has characterization parameters matching the generated one or more characterization parameters of the media content.

2. The content caching system according to claim 1, wherein the one or more characterization parameters include a checksum or a hash sum over one or more segments of the given media content.

3. The content caching system according to claim 1, wherein said network data flow controller is further adapted to terminate the stream from the content source upon said routing module routing said selected media content to said client device.

4. The content caching system according to claim 1, wherein the routing module is further configured to route a second media content streaming through said network data flow manager to said cache repository for storage, in the event that said comparison module determines there is no media content in said cache repository having characterization parameters matching one or more characterization parameters of the second media content.

5. The content caching system according to claim 4, wherein the network data flow manager is further configured to forward a stream of the second media content to the client device in parallel with routing the second media content to said cache repository.

6. The content caching system according to claim 4, wherein the network data flow manager is further configured to route the second media content to the client device from the cache repository after routing at least a portion of the second media content to said cache repository from a second external content source.

7. The content caching system according to claim 6, wherein the network data flow manager is further configured to terminate a session with the second external content source substantially when the second media content is fully stored in said cache repository.

8. The content caching system according to claim 4, wherein the network data flow manager is further configured to continue a session with the external content source even when the client disconnects from the gateway network.

9. A gateway network comprising:
a network data flow controller comprising circuitry adapted to regulate data flow between an external content source, a client device and a cache repository and forward a first stream of a given media content from the content source to the client device;
a content caching unit comprising:
said cache repository to store media contents and characterization parameters of the media contents; and
processing circuitry communicatively coupled to a digital memory containing processor executable code, which processor executable code causes said processing circuitry to:
(1) generate one or more characterization parameters of the given media content streaming through said network data flow controller from the external content source to the client device;
(2) compare the generated one or more characterization parameters of the given media content against the stored characterization parameters of the stored media contents in said cache repository;
(3) the event that a match to the one or more characterization parameters is not found in said cache repository, cause said network data flow controller to route a second stream of the given media content from the external content source to said cache repository, in parallel to the first stream of the given media content from the external content source to the client device; and
(4) upon a predetermined portion of the given media content being received by said cache repository, cause said network data flow controller to terminate the streaming of the given media content from the external content source to the client device and commence streaming of the given media content from said cache repository to the client device.

10. The gateway network according to claim 9, further comprising a proxy server associated with said cache repository configured to stream the given media content from said cache repository to the client device.

11. The gateway network according to claim 10, wherein said proxy server is configured to stream the given media content to the client device using substantially the same content source addressing as the external content source.

12. The gateway network according to claim 11, wherein said proxy server is configured to employ spoofing to modify the content source address of the content.

13. The gateway network according to claim 9, wherein the routing module is further configured to continue a session with the external content source until the given media content is received by said cache repository in its entirety, following a client device connection termination.

14. The gateway network according to claim 9, wherein said content caching unit is integral to a core network infrastructure of said gateway network.

15. The gateway network according to claim 9, wherein said content caching unit is integral to an access network infrastructure of said gateway network.

16. A method for caching content in a gateway network comprising:
storing media contents and characterization parameters of the media contents in a cache repository;
forwarding, by a network data flow controller comprising circuitry adapted to regulate data flow between an external content source and a client device, a first stream of a given media content from an external content source to a client device;
generating, by processing circuitry communicatively coupled to a digital memory and said network data flow controller, one or more characterization parameters of the given media content streaming from the external content source to the client device;
comparing, by the processing circuitry, the one or more characterization parameters of the given media content against the stored characterization parameters of the stored media contents;
in the event that a match to the one or more characterization parameters is not found in said cache repository, routing a second stream of the given media content from the external content source to the cache repository, in parallel to the first stream of the given media content from the external content source to the client device; and
upon a predetermined portion of the given media content being received by the cache repository, terminating the streaming of the given media content from the external content source to the client device and commencing streaming of the given media content from said cache repository to the client device.

17. The method according to claim 16, further comprising continuing a session with the external content source until the given media content is received by said cache repository in its entirety, following a client device connection termination.

18. The method according to claim 16, further comprising using a proxy server associated with said cache repository to stream the given media content from said cache repository to the client device.

19. The method according to claim 16, further comprising streaming the given media content to the client device using substantially the same content source addressing as the external content source.

20. The method according to claim 16, further comprising spoofing to modify the content source address of the content.

* * * * *